United States Patent [19]

Kurihara et al.

[11] Patent Number: 5,062,121
[45] Date of Patent: Oct. 29, 1991

[54] SPREAD SPECTRUM COMMUNICATION DEVICE

[75] Inventors: Takao Kurihara; Masahiro Hamatsu, both of tokyo, Japan

[73] Assignee: Clarion Co., Ltd., Tokyo, Japan

[21] Appl. No.: 418,206

[22] Filed: Oct. 6, 1989

[30] Foreign Application Priority Data

Oct. 11, 1988 [JP] Japan .................................. 63-255396

[51] Int. Cl.⁵ .............................................. H04K 1/00
[52] U.S. Cl. .......................................... 375/1; 380/34; 364/717; 331/78
[58] Field of Search ................. 375/1; 380/34, 46, 48, 380/50; 364/717; 331/78

[56] References Cited

U.S. PATENT DOCUMENTS

| 3,920,894 | 10/1975 | Shirley et al. | 331/78 |
| 3,984,668 | 10/1976 | Zetterberg et al. | 380/46 |
| 4,115,657 | 9/1978 | Morgan | 331/78 |
| 4,418,393 | 11/1983 | Zscheile, Jr. | 375/1 |
| 4,785,410 | 11/1988 | Hamatsu et al. | 364/717 |
| 4,809,295 | 2/1989 | Zscheile, Jr. et al. | 375/1 |
| 4,827,514 | 5/1989 | Ziolko et al. | 380/48 |
| 4,847,861 | 7/1989 | Hamatsu et al. | 375/1 |
| 4,862,178 | 8/1989 | Sturza et al. | 375/1 |
| 4,862,479 | 8/1989 | Hamatsu et al. | 375/1 |
| 4,943,975 | 7/1990 | Kurihara et al. | 375/1 |

Primary Examiner—Thomas H. Tarcza
Assistant Examiner—Tod Swann
Attorney, Agent, or Firm—Wallenstein, Wagner & Hattis, Ltd.

[57] ABSTRACT

An SSC device according to the SSC method using a correlator is disclosed, in which a plurality of stages of shift register is connected in series, the outputs of the stages of the shift register being given selectively to the correlator and the initial value of the shift register in the pseudo noise code generator on the receiving side are set in a mirror image relation with respect to the initial value of the transmitted signals of the pseudo noise code generator at the code synchronization.

2 Claims, 4 Drawing Sheets

SPREAD SPECTRUM COMMUNICATION DEVICE

FIELD OF THE INVENTION

The present invention relates to a spread spectrum communication (hereinbelow abbreviated to SSC) device using a correlator.

BACKGROUND OF THE INVENTION

In the SSC, as indicated in FIG. 3A, a pseudo-noise (hereinbelow abbreviated to PN) code, which is one of binary codes, is modulated with data, and a carrier modulated with the modulated PN code is transmitted. In the figure, reference numeral 31 indicates the data source; 32 is a modulator; 33 is a PN code generator; 34 is a carrier generator; 35 is a modulator; and 36 is an antenna. On the receiver side, as indicated in FIG. 3B, the signal is received and the correlation thereof with a PN code serving as a reference is formed in a matching filter. When the two codes are in accordance with each other and when they appear nearly at same places, the data are restored by processing a self correlation waveform (hereinbelow called correlation spike waveform) having relatively great amplitudes. In the figure, reference numeral 38 is a correlator; 39 is a reference PN code generator; 40 is a data demodulator; and 41 represents the data.

The convolver can be cited as one of the possible matching filters. A convolver is a functional element effecting convolute integration and if the reference binary code (hereinbelow called simply reference code) is in a relation of being inverted in time with respect to the received code, it serves as a matching filter effecting the correlation operation.

As an example of the convolver, there is known a surface acoustic wave (hereinbelow abbreviated to SAW) convolver. SAW convolvers can be classified from the viewpoint of the construction into: (1) those in which an air gap is disposed between a piezoelectric layer and a silicon layer; (2) those in which a piezoelectric layer is formed in one body with a silicon layer through an oxide layer; (3) those composed uniquely of a piezoelectric layer; etc. All of them effect multiplying operations based on the interaction of the two signals, while utilizing non-linear characteristics thereof and the results thus obtained are integrated at an electrode called a gate disposed on an interaction region of the convolver.

FIG. 4 shows an example ilustrating the construction of an SAW convolver. In the figure, reference numerals 42 and 43 are transducers; 44 is a piezoelectric layer; 45 is an oxide layer; 46 is a silicon layer; and 47 is a gate electrode. A signal s(t) inputted through the transducer 42 propagates towards the right and the other signal r(t) inputted through the transducer 43 propagates towards the left. The non-linear characteristics which the piezoelectric body—oxide layer—silicon structure has give rise to the interaction between the signals s(t) and r(t), by which the multiplying operation is effected, and the result thus obtained is integrated by the gate electrode 47.

The signal c(t) outputted by the gate electrode 47 is expressed by the following equation;

$$c(t) = A \int_{t-T}^{t} r\left(t - \frac{x}{v}\right) s\left(t - T + \frac{x}{v}\right) dx/v$$

where A represents a constant; T the time necessary for making acoustic wave pass through under the gate electrode (hereinbelow called in-gate delay time); x the distance measured in the propagation direction of the signal s(t); and v the sound velocity.

Prior art SSC methods are disclosed in Japanese Patent Documents JP-A-61-280135 and JP-A-63-18835. For example, it is conceivable to use not only various kinds of m code (maximum length linearly occurring code) sequences but also the initial phases of the m code sequences on both the transmitting and the receiving sides as the communication channel dividing means, in the case where the m code sequence is used as the spreading code, in the direct spreading SSC using a correlation such as an SAW convolver. The algorithm, etc. for determining the data demodulation timing and the initial phase information of the m code sequences is described in Japanese Patent Documents JP-A-63-95744.

FIG. 2 is a block diagram illustrating the construction of the code generating device indicated therein.

In FIG. 2, $SR_1 \sim SR_n$ are flipflops constituting a shift register; $E_1 \sim E_n$ are exclusive logic sum gates; $G_1 \sim G_n$ are steering gates for giving the flipflops stated above the intial values therefor; MPX is a multiplexer of a 3-state output; $L_1 \sim L_5$ are latch circuits; AND-$_0 \sim$ AND$_n$ are AND circuits; DE-MPX is a demultiplexer; INV$_1$ and INV$_2$ are inverters. Further $\overline{FBCNT}$ is a control signal for controlling the 3-state output in an enable or a disable state and $L_6$ is a latch circuit for effecting the state control of the 3-state output in synchronism with the STB signal. Still further STB is an initializing signal for the m series code generation; $\overline{CS}$ is a chip select signal; LE is a latch enable signal; $DAT_{1 \sim n}$ are data; $SEL_0$ and $SEL_1$ are data select signals; FB0 is a feedback input terminal; FB1 is an input terminal for the first stage steering gate; and PN is a code output.

FIG. 5 shows a connection scheme, in the case where the code generator indicated in FIG. 2 is used. TABLE 1 shows the correspondence between the terminals a, b, c and d in FIG. 5 and the name of the signals in FIG. 2.

TABLE 1

| PNG | CODE GENERATOR |
|-----|----------------|
| a   | FB0            |
| b   | FB1            |
| c   | FB2            |
| d   | PN             |
| e   | CAS            |

The code output PN is used as the code output (A) of the PN code generator 33 in FIG. 3A on the transmitting side and inputted in the SAW convolver on the receiving side as the received PN code included in the received signal s(t). Further it is used as the code output (B) of the reference PN code generator 39 in FIG. 3B on the receiving side and inputted in the SAW convolver on the receiving side as the reference PN code included in the reference signal r(t).

In the case where a PN code generator (hereinbelow abbreviated to PNG) by the method described above is used for the SSC stated above, since the code output is obtained from the first stage of a plurality of stages of the shift register, i.e. since it is necessary to set different values for the initial phase information of the transmitted PN code, and the initial state of the shift register in the receiving PNG, i.e. the initial phase information of the received PN code, it has the problem that the transmission and reception switching-over speed is reduced, depending on the processing speed of an external circuit (e.g. microprocessor).

This problem exists not only in the case where the code output is obtained from the first stage of the shift register but also in the case where it is obtained from the other stages except for the last stage of the shift register.

OBJECT OF THE INVENTION

The object of the present invention is to provide an SSC device capable of obtaining the initial value of the shift register on the receiving side (PNG) without requiring any complicated calculation for the initial value of the shift register on the receiving side, which is to be set at the code synchronization.

SUMMARY OF THE INVENTION

In order to achieve the above object, an SSC device according to the present invention is provided with a PNG including a plurality of stages of shift register. This PNG is provided with the plurality of stages of shift register connected in series and at the same time shift register selecting means, in which the output stage of each of the plurality of stages of the shift register is inputted and which selects either one of the plurality of output stages as well as means for inputting the output of the shift register selecting means in the correlator, wherein the initial value of the shift register in the PNG on the receiving side is set in a mirror image relation with respect to the initial value of a transmitted signal of the PNG at the code synchronization.

Contrary to the fact that heretofore the code output PN was obtained from the first stage of the shift register, according to the present invention, it is possible to use the initial phase information of the PN code in common both for the transmission and for the reception by obtaining the code output PN from the last stage of the shift register.

DETAILED DESCRIPTION

Figure 1:
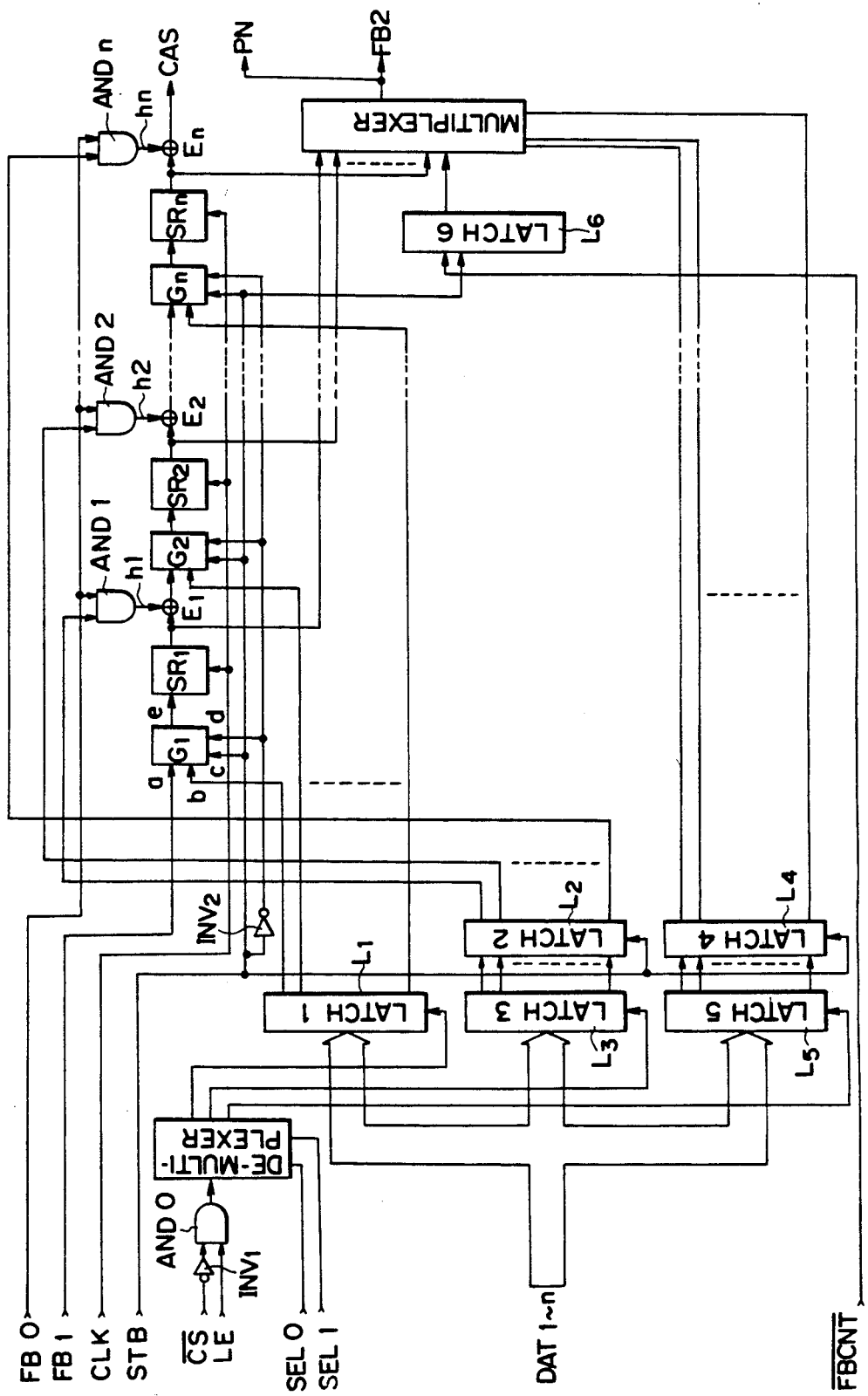
FIG. 1 is a block diagram illustrating the construction of a PNG according to the present invention.
Figure 2:
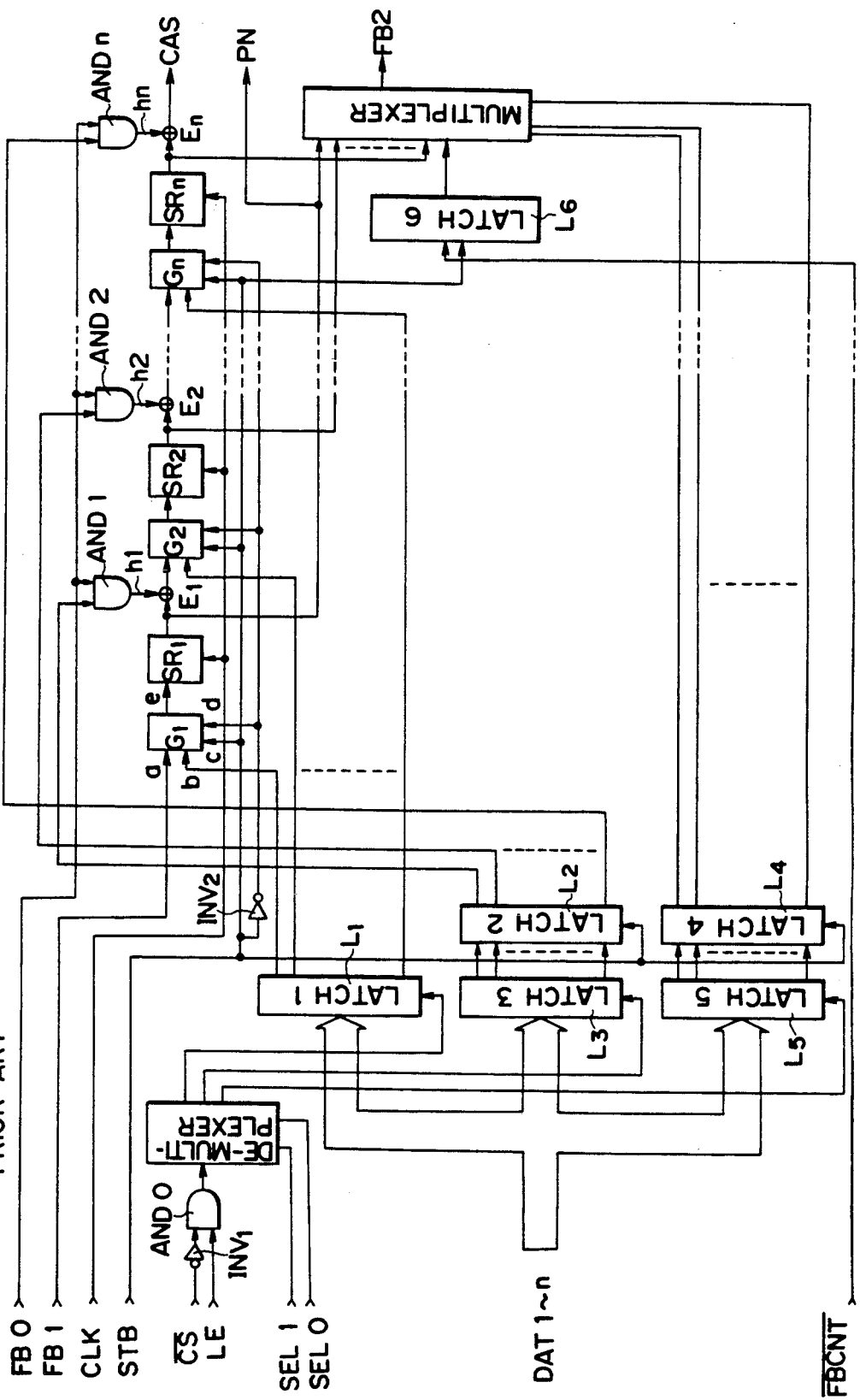
FIG. 2 is a block diagram illustrating the construction of a prior art PNG.
Figure 3A:
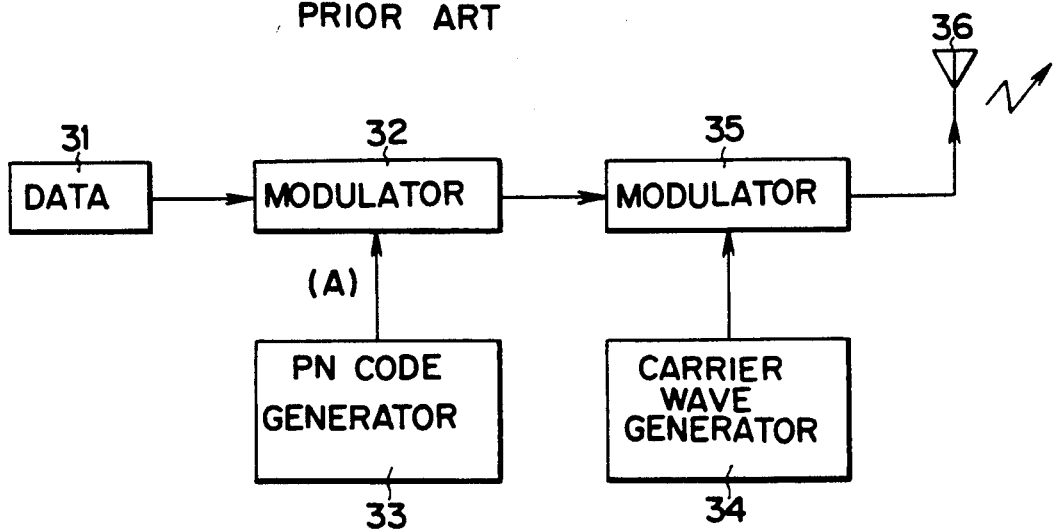
FIGS. 3A & B is a block diagram showing an example of the SSC system.
Figure 3B:
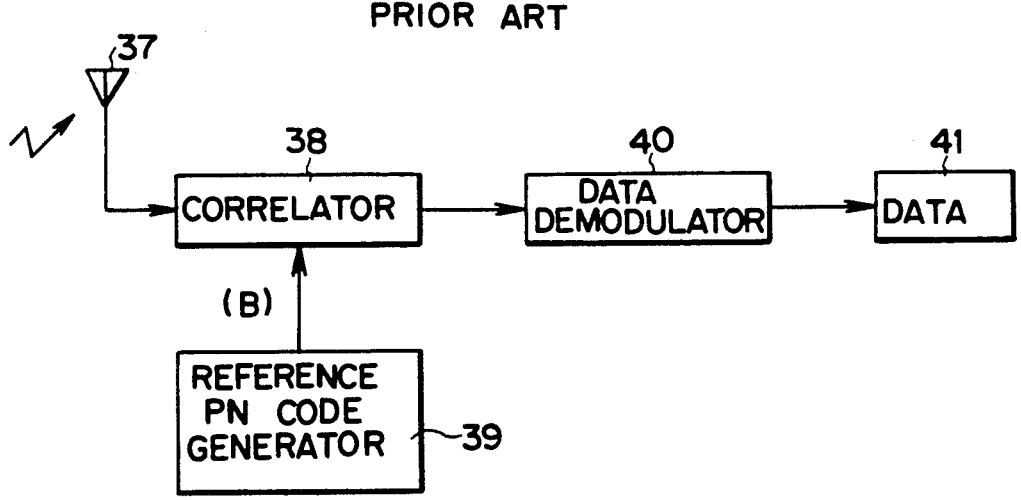
Figure 4:
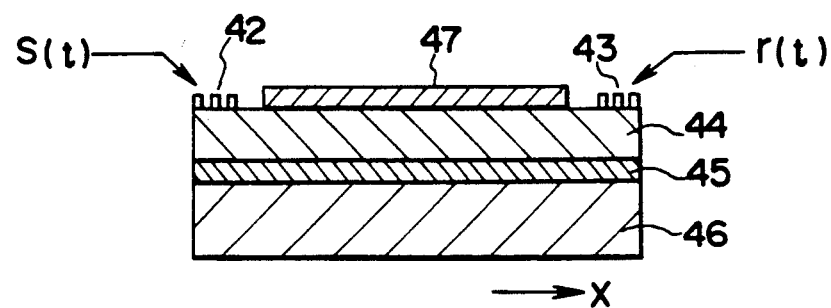
FIG. 4 is a cross-sectional view indicating an example of the construction of an SAW convolver.
Figure 5:
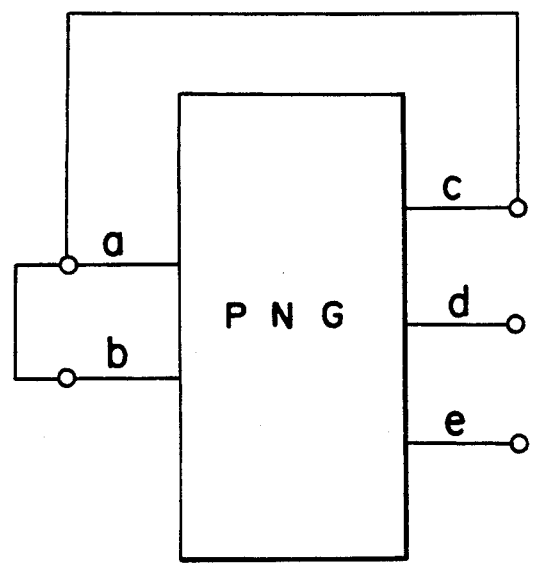
FIG. 5 shows the connection relation of the PNG indicated in FIG. 2.

Figure is a block diagram illustrating the construction of the PNG according to the present invention, in which the same reference numerals indicate the circuits or the signals identical or analoguous to those indicated in FIG. 2. What differs from the device indicated in FIG. 2 consists in that the code output PN is obtained from the last stage of the shift registers.

Now the operation of the embodiment described above will be explained.

It will be explained below that when the code output is obtained from the last stage, the initial stages of the shift registers, for which the transmitted and the received m code sequence are in the "in-phase mirror image" relation, are in the "mirror image" relation.

Briefly speaking, it is because the transmitting side coefficient matrix P is identical to the receiving side coefficient matrix Q.

The reason why the matrices P and Q have a same value will be described below.

All the following calculations are effected according to the Boolean algebra.

(1) Correspondence relation between P and Q

According to Japanese Patent Documents JP-A-63-95744, the matrices P and Q can be expressed as follows:

$$P = \begin{pmatrix} (n-i+1) - th \text{ line of } I_n \\ (n-i+1) - th \text{ line of } A \\ (n-i+1) - th \text{ line of } A^2 \\ \cdot \\ \cdot \\ \cdot \\ (n-i+1) - th \text{ of line of } A^{n-1} \end{pmatrix} \quad (1)$$

$$Q = \begin{pmatrix} i - th \text{ line of } A \\ i - th \text{ line of } A^2 \\ i - th \text{ line of } A^3 \\ \cdot \\ \cdot \\ \cdot \\ i - th \text{ line of } A^n \end{pmatrix}$$

where i represents the number of the output tap.

(2) When the code output is obtained from the last stage.

When the code output is obtained from the last stage, it is obtained by extracting the first lines of $I_n$, A, and powers of A for P and the last line thereof for Q.

(a) On the first line of the matrices P and Q: From Equation (1)

First line of P: first line of $I_n$

First line of Q: last line of A

Paying attention to $I_n$ and A,

First line of $I_n$ = last line of A,

Consequently it can be understood that First line of P = First line of Q is valid.

(b) On the second and the following lines of the matrices P and Q:

The second and the following lines of the matrices P and Q can be obtained from A and powers of A.

Now $A^2$ can be obtained as follows:

$$A^2 = A \cdot A = \begin{pmatrix} h_{n-1} & & \\ h_{n-2} & & \\ \cdot & & \\ \cdot & I_{n-1} & \\ \cdot & & \\ h_1 & & \\ 1 & 0 \ldots 0 \end{pmatrix} \cdot \begin{pmatrix} h_{n-1} & & \\ h_{n-2} & & \\ \cdot & & \\ \cdot & I_{n-1} & \\ \cdot & & \\ h_1 & & \\ 1 & 0 \ldots 0 \end{pmatrix} \quad (2)$$

-continued $$= \begin{pmatrix} h_{n-1} \cdot h_{n-1} \oplus 1 \cdot h_{n-2} \\ \oplus 0 \cdot h_{n-3} \oplus \ldots \oplus 0 \cdot 1 & h_{n-1} \\ & h_{n-2} \\ & & \cdot \\ & & & I_{n-2} \\ & & & & h_1 \\ 1 \cdot h_{n-1} \oplus 0 \cdot h_{n-2} \\ \oplus \ldots \ldots \ldots \oplus & 0 \cdot 1 & 1 & 0 \ldots 0 \end{pmatrix}$$

Rearranging Equation (2), the following equation is obtained:

$$A^2 = \begin{pmatrix} h_{n-1} \oplus h_{n-2} & h_{n-1} & 10 \ldots 0 \\ & & h_{n-2} \\ & & \cdot & I_{n-2} \\ & & & \cdot \\ & & & & h_1 \\ h_{n-1} & 1 & 0 \ldots 0 \end{pmatrix} \quad (3)$$

where the first line of A = the last line of $A^2$.

Next $A^3$ is obtained as follows:

$$A^3 = A^2 \cdot A = \begin{pmatrix} h_{n-1} \oplus h_{n-2} & h_{n-1} \\ & h_{n-2} & I_{n-3} \\ & & \cdot \\ & & & h_1 \\ h_{n-1} & 1 & 0 \ldots 0 \end{pmatrix} \cdot \quad (4)$$

$$\begin{pmatrix} h_{n-1} \\ h_{n-2} & I_{n-3} \\ h \\ 1 & 0 \ldots 0 \end{pmatrix}$$

$$= \begin{pmatrix} (h_{n-1} \oplus h_{n-2}) \cdot h_{n-1} \oplus h_{n-1} \cdot h_{n-2} \oplus 1 \cdot \\ h_{n-3} \oplus 0 \cdot h_{n-4} \oplus \ldots \oplus 0 \cdot 1 \, h_{n-1} \oplus & h_{n-2} & h_{n-1} \\ & & h_{n-2} \\ & & & I_{n-3} \\ & & & & h_1 \\ h_{n-1} \cdot h_{n-1} \oplus 1 \cdot h_{n-2} \oplus 0 \cdot h_{n-3} \oplus \ldots \oplus & 0 \cdot 1 \\ & & 1 & 0 \ldots 0 \end{pmatrix}$$

Rearranging Equation (4), the following equation is obtained:

$$A^3 = \begin{pmatrix} (h_{n-1} \oplus h_{n-2}) \cdot h_{n-1} \oplus h_{n-1} \cdot h_{n-2} \oplus \\ h_{n-3} & h_{n-1} \oplus h_{n-2} & h_{n-1} \\ & & h_{n-2} \\ & & \cdot & I_{n-3} \\ & & & h_1 \\ h_{n-1} \oplus h_{n-2} & h_{n-1} & 1 & 0 \ldots 0 \end{pmatrix} \quad (5)$$

where the first line of $A^2$ = the last line of $A^3$.

Further $A^4$, $A^5$, - - -, $A^n$ are calculated in the same way and for every time the first line is placed at the (x+1)-th line of P (x: power of A) and the last line is placed at the x-th line of Q. Paying attention to the calculation process of the powers of A, it can be understood that the operation of obtaining the succeeding power by multiplying a certain power of A by A is equivalent to placing the first line of the multiplicand at the last line of the result of the multiplying operation.

In this way it can be understood that P=Q by continuing to extract the second and the following lines of P and Q from A and powers of A.

From Japanese Patent Document JP-A-63-95744, the receiving side initial state Y(0) can be obtained by:

$$PX(O) = QY(O) \quad \text{tm (6)}$$

By using Equation (6), when the code output is obtained from the last stage, since P=Q, $$X(O) = Y(O)$$

is valid.

As explained above, according to the present invention, in an SSC device using a correlator such as an SAW convolver, in which information is demodulated by forming the code synchronization between the transmitting side PN code and the receiving side PN code, it is possible to obtain simply the relevant initial values without calculating the initial values of the receiving side PN code by using the complicated algorithm described in Japanese Patent Document JP-A-63-95744.

While particular embodiments of the invention have been shown and described, it will be obvious to those skilled in the art that various changes and modifications may be made without departing from the present invention in its broader aspect.

What is claimed is:

1. In a spread spectrum communication circuit in which transmitted signals obtained by spreading the spectrum of information signals by means of a pseudo-noise code cycle are received and desired information signals are restored by inputting the signals thus received and another pseudo-noise code produced by a local pseudo-noise code generator into a correlator in the form of a surface acoustic wave convolver on the receiving side, the improvement wherein said pseudo-noise code generator for generating said pseudo-noise code comprises:

a plurality of shift register stages connected in series to form a chain having an output end;

means for advancing the contents of all but the last of said stages to the next stage of said chain and towards said output end;

shift register selecting means, in which the output of each of said plurality of stages of the shift registers is inputted and including means for selectively outputting from among any of said plurality shift register outputs;

means for inputting the output of said shift register selecting means into said convolver;

means for setting the initial value of said shift register in the pseudo-noise code generator on the receiving side in a mirror image relation with respect to the initial value of the pseudo-noise code generator at the transmitter at the time of code synchronization; and feedback means for logically combining the inputs of selected shift register stages with the output of the last of said stages to modify the contents of the stages fed by said selected stages attendant to each advance so that by setting said selecting means to output the contents of said last stage a time-reversed image of an entire cycle of the transmitted pseudo-noise code will be sent to said convolver.

2. A spread spectrum communication device according to claim 1, wherein said shift register selecting means is a multiplexer and the output stage of each of the stages of the shift registers is connected with the input of said multiplexer.

* * * * *